Sept. 8, 1953     C. MILLER     2,651,533
SWIVEL
Filed Aug. 10, 1948
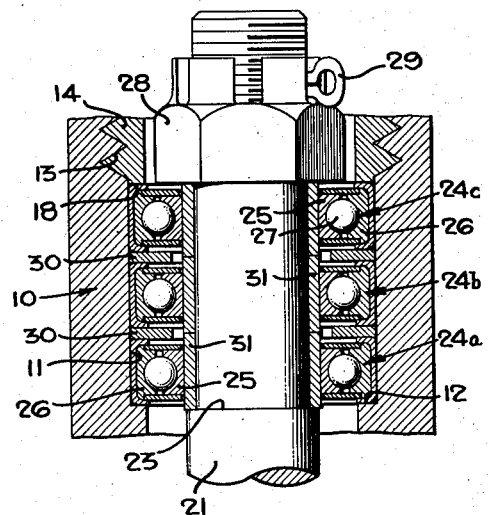
*Fig.2.*
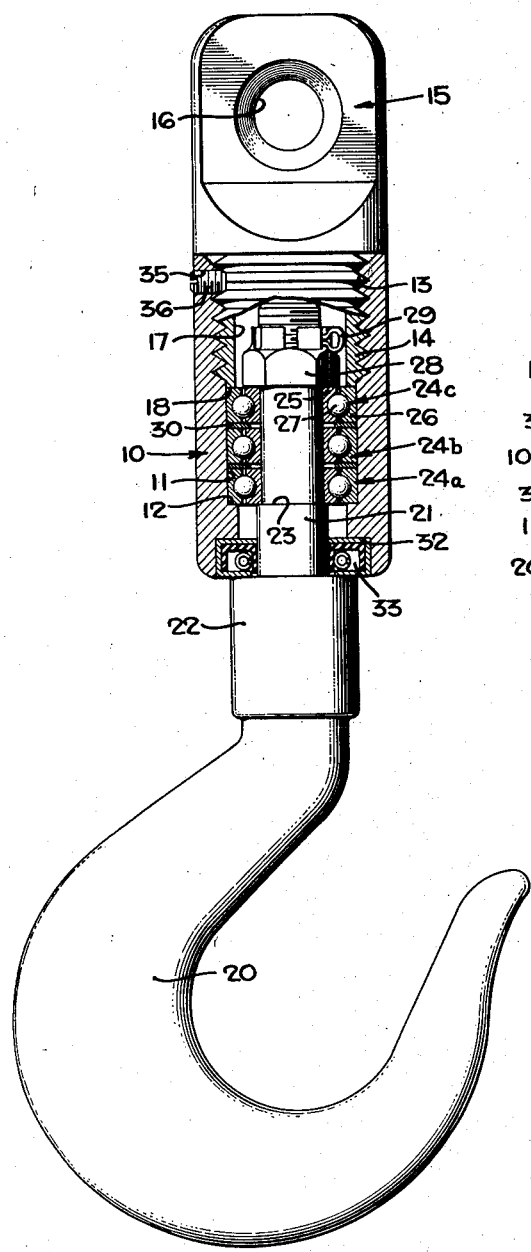
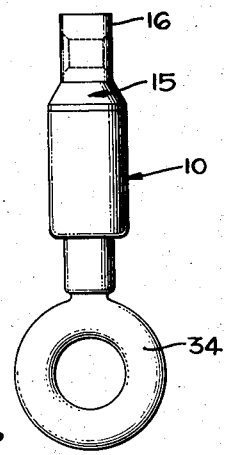
*Fig.3.*
*Fig.1.*
CECIL MILLER,
INVENTOR.
BY
Robert D. Fulwider
ATTORNEY Patented Sept. 8, 1953

2,651,533

UNITED STATES PATENT OFFICE 2,651,533

SWIVEL

Cecil Miller, Pomona, Calif.

Application August 10, 1948, Serial No. 43,372

2 Claims. (Cl. 287—91)

My invention relates generally to swivels and more particularly to a free rotating ball or roller bearing swivel which is of especial use when embodied in a crane hook. It is common practice to swivel connect the loading hook with the line of a crane or other hoisting device, to prevent torsional strain and twisting of the line, and my device overcomes many disadvantages heretofore encountered in such use, although it is not so limited and may be employed elsewhere as desired.

By keeping the weight on the unloaded line at a minimum the dangerous swinging tendency of this free weight is reduced, and the device is more efficient and easier to handle. In addition, it is desirable that the length of any necessary rigid sections inserted between the hook and the line should be kept short, and any joints which would tend to unscrew or otherwise give way should be eliminated. The use of my swivel design and construction permits the hook or eye to be forged in one piece with the shaft member forming an integral part of the swivel. In effect, the swivel may be contained in the shank of the hook, and the length and weight of such a section is materially reduced.

It is another object of my invention to support the hook freely rotatable within the housing in such a manner that the axial distance between the support point of the hook and the lower end of the bearing surface is short, reducing much of the bending stress which creates a radial load on the bearings and tends to bind the shaft within the swivel.

An additional object of my invention is to provide a plurality of ball or other type of rolling element bearings which are designed for both a radial and thrust load, so as to distribute the thrust load axially along the housing and form a large bearing surface for the distribution of radial stresses. By this design the hook shaft is kept free from the housing at all points and cannot rub or bind against it.

It is also an object of my invention to provide a swivel of overall streamline shape having no abrupt projections which might catch during lifting or lowering operations on hatch edges, beams, or the like, and to keep the diameter of the swivel small in order to avoid interfering with the proper use of the hook.

Still another object of my invention is to provide a self lubricating swivel which is sealed to retain the lubricant and to prevent contamination by dirt or moisture.

A further object of my invention is to provide a swivel with a minimum of parts that may be easily assembled or disassembled, and of such sturdy and durable construction as to give long and satisfactory service.

These and other objects and advantages of my invention will become apparent from the following description of a preferred form thereof, and from an inspection of the accompanying drawings in which:

Fig. 1 is a side elevation partially in section of a preferred form of my invention having a hook type lower coupling member;

Fig. 2 is a fragmentary central vertical section showing the details of the bearing construction; and Fig. 3 is a side elevation of a preferred form of my invention having an eye or ring type of lower coupling member, with the housing rotated relative to the end member to show the flattened sides of the top coupling member.

Referring now to the drawing and particularly to Fig. 1 thereof, the numeral 10 indicates a suitable shell or housing of cylindrical shape having an axial bore 11 extending entirely therethrough, the lower portion of the bore being reduced to form an internal annular shoulder 12. In the upper portion of the bore 11 female threads 13 are provided to receive a male externally threaded lower extension or hub 14 of a top end coupling member 15. The upper surface of this coupling member 15 forms a vertically flattened block in which is cut a central aperture 16 for attachment to a shackle pin or the end of the hoisting line. Within the hub 14 is an axial cavity or pocket 17 forming an annular shoulder 18 on the end face of the hub 14.

A lower end coupling member such as the hook 20 has an upper shaft or axial hub 21 of reduced diameter adapted to extend freely within the bore 11. At the base of the shaft 21 is a lateral extension 22, and upwardly spaced from the base on the shaft 21 is an external shoulder 23, this design permitting the hook 20 and the shaft 21 to be made from a single forging to give maximum strength.

A series of vertically stacked annular ball bearing sets 24a, 24b, and 24c, respectively, are fitted within the bore 11 in coaxial side-by-side relationship; each bearing set 24 having an inner and outer race 25 and 26 respectively, whose adjacent cooperating faces are separated by spherical balls 27 and are substantially parallel to the axis of the shaft 21. The adjacent faces of the inner and outer races 25 and 26 have an annular groove therein in which the spherical balls 27 seat, so that they are supported over an arc of their surface and are thus able to transmit both axial and radial loads. In the preferred form I use a bearing having a deep groove with a high degree of osculation to better transmit both radial and axial loads and prevent false Brinnelling under the severe static loads which may be sustained.

The outer race 26 of the lower bearing 24a seats on the annular shoulder 12, and the shaft 21 is inserted from the bottom of the housing 10 coaxial with the bore 11 and the annular bearings 24, so that the radial wall of the shoulder 23 bears against the inner race 25 of the bearing 24a and is substantially aligned with the radial wall of the annular shoulder 12. The diameter of the shaft 21 is materially less than that of the bore 11 to avoid any contact between the shaft 21 and the housing 10 and insure that all the loads on the shaft 21 are transmitted through the bearings 24 to the housing 10.

A projecting locking means such as the castellated nut 28 threadedly engages the upper end of the shaft 21 and bears downwardly against the inner race 25 of the upper bearing 24c holding the inner races against the shoulder 23. The nut 28 is prevented from turning on the shaft 21 by a cotter key 29 passing through a hole in the shaft 21 and through a pair of radial slots in the castellated surface of the nut. Washers 30 between the bearings 24a, 24b, and 24c, space them apart, but a continuous bearing surface surrounds the shaft 21 since each inner bearing race 25 has an axially extended internal sleeve 31 abutting the adjacent sleeves.

The threaded hub 14 of the upper coupling member 15 engages the internal threads 13 of the bore 11, and its shoulder 18 bears downwardly against the outer race 26 of the upper bearing 24c to hold the outer races 26 constrained between the annular shoulder 12 and the shoulder 18, the axial cavity 17 fitting freely over the end of the shaft 21 and the nut 28. A radial opening 35 is bored through the annular wall surrounding the threads 13 and into the hub 14, and after the coupling member 15 is in place a suitable threaded plug 36 is screwed therein to prevent separation of the coupling member from the housing 10.

The method of load distribution can now be easily understood. Radial loads on the hook 20 are distributed by the shaft 21 to the inner races 25. They are then carried through the balls 27 to the outer races 26, the lines of force being perpendicular to the adjacent cooperating faces of the races 25 and 26. From the outer races the loads are further transmitted to the walls of the housing surrounding the bore 11.

Axial tension loads acting downwardly on the hook 20 are transmitted from the projecting nut 28 on the shaft 21 to the inner races 25. Since the adjacent cooperating faces of both the inner and outer races 25 and 26 are grooved, and the spherical balls 27 are seated within these grooved faces, axial loads on the inner races 25 are distributed to the balls 27 through the grooved walls of the inner race 25. They are then carried across the balls 27 to the opposed grooved walls of the outer race 26, the lines of force being at an oblique angle with the adjacent cooperating faces. From the outer races 26 these axial loads are then further transmitted to the annular shoulder 12 of the housing 10. The hub 14 of the end coupling member 15 is firmly engaged with the housing 10 and all loads transferred to the housing 10 are carried through the hub 14 to the aperture 16 for transfer to a supporting means.

If by dropping or some other operation, axial compression or shock loads are placed on the hook 20 and the shaft 21, they will be transmitted to the inner races from the projecting shoulder 23. Again they will be distributed to the balls 27 and through them to the outer races 26, the lines of force being at an oblique angle with their adjacent faces. From the outer race they will be further transmitted to the shoulder 18 of the hub 14, and directly to the aperture 16.

In the preferred form shown there are three such sets of bearings 24, although of course the number of bearings can be varied and will depend on the size and use of the swivel. The bearings 24 are of standard manufacture and types other than those shown may be used, such as tapered roller thrust bearings. By the use of a series of vertically stacked bearings to distribute the load, I am able to use a smaller race and ball size and consequently reduce the outer diameter of the housing without any reduction in strength. Furthermore, the axial distribution of the bearing surface over the greater length of the shaft 21 prevents any binding within the bearings when a bending force acts on the unsupported end of the hook 20.

The lower end of the housing 10 is counterbored forming the pocket 32 into which a sealing or lubricant retaining ring 33 is fitted. Beneath the ring 33 is the lateral extension 22 of the shaft 21 which protects the sealing ring 33 from damage. By cooperating with the axial hub 14, the sealing ring 33 provides a sealed lubrication chamber enclosing the bearings 24 to keep them lubricated over long periods and free from contamination by dirt or moisture.

Fig. 3 shows an optional form of my invention having an end coupling member with an eye 34 in place of the hook 20, and this or other type of end such as clevis, stud, or swedged ends may be used without trouble, as the assembly or disassembly of the swivel is not affected by the size or shape of the end members.

It can thus be seen that I have created a swivel having many operational advantages and an overall streamline shape, without any sacrifice in strength or durability. It is understood of course that modifications may be made in the design and construction by those skilled in the art which will in no way depart from the spirit of my invention, and I do not wish to be limited except as defined in the appended claims.

I claim:

1. A swivel for heavy static loads which includes: an elongated housing having an axial bore therethrough with an internal shoulder adjacent one end; an end coupling member having a shaft extending coaxially into said bore from its shoulder end, said shaft having an upper portion of reduced diameter forming an external shoulder on said shaft adjacent said housing shoulder; a plurality of bearing assemblies each having inner and outer races and spherical balls seated in annular grooves in the adjacent cooperating faces of each of said pair of cooperating inner and outer races, the grooves of said outer races all having axially upwardly presented ball engaging faces and the grooves of said inner races all having axially downwardly presented ball engaging faces, the lowermost of said outer races resting only on said shoulder within said housing and the balance of said outer races being unyieldingly supported in coaxial relationship on said lowermost outer race, the lowermost of said inner races resting only on said shoulder on said shaft and the balance of said inner races being unyieldingly supported in coaxial relationship on said lowermost inner race; a lock nut threadedly engaged on said shaft and bearing against the uppermost of said inner races to hold said inner races tightly against said shoulder on said shaft; and an opposite end member having a threaded axial hub engaged within the end of said housing opposite said internal shoulder, and bearing against the uppermost of said outer races to hold said outer races tightly against said shoulder within said housing, said hub having an internal cavity of larger diameter than the outer diameter of said inner races for spacing said hub therefrom and receiving said nut and the upper end of said shaft therein.

2. A swivel as described in claim 1 wherein said housing is provided with an outwardly opening recess adjacent said shoulder, a sealing ring mounted in said recess and surrounding said shaft for cooperatively sealing therewith to close the interior of said housing.

CECIL MILLER.

References Cited in the file of this patent

UNITED STATES PATENTS

| Number | Name | Date |
| --- | --- | --- |
| 1,150,892 | Sherwood | Aug. 24, 1915 |
| 1,448,189 | Brunner | Mar. 13, 1923 |
| 1,642,958 | Joyner | Sept. 20, 1927 |
| 1,767,429 | Brittain et al. | June 24, 1930 |
| 2,114,911 | Burt | Apr. 19, 1938 |
| 2,198,744 | Schwemlein | Apr. 30, 1940 |
| 2,346,380 | King | Apr. 11, 1944 |
| 2,347,631 | Hotchkiss | Apr. 25, 1944 |
| 2,416,886 | Stevens | Mar. 4, 1947 |
| 2,429,929 | Fisher | Oct. 28, 1947 |
| 2,457,444 | Cave | Dec. 28, 1948 |

FOREIGN PATENTS

| Number | Country | Date |
| --- | --- | --- |
| 543,931 | France | of 1922 |